United States Patent Office 3,251,830
Patented May 17, 1966

3,251,830
TETRAHALODIAZOCYCLOPENTADIENE AND
ITS PREPARATION
David Knutson, Niagara Falls, N.Y., assignor to Hooker Chemical Corporation, Niagara Falls, N.Y., a corporation of New York
No Drawing. Filed Sept. 19, 1963, Ser. No. 310,144
5 Claims. (Cl. 260—239)

This invention relates to tetrahalodiazocyclopentadiene, useful as a fungicide, bactericide, insecticide and herbicide, and as an intermediate to make useful derivative compounds. A preferred halo compound is tetrachlorodiazocyclopentadiene and derivatives made therefrom are those of olefins and tertiary phosphines. Also included within the invention are novel processes for making tetrahalodiazocyclopentadienes.

In accordance with the invention, there is provided as a new composition of matter, tetrahalodiazocyclopentadiene

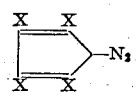

wherein X is halogen. The halogens may be either the same or different. Of the halogens, X is most preferably chlorine, although bromine and iodine are also useful and the fluorinated compound may be made, too. In a preferred method of manufacture, a corresponding tetrahalocyclopentadienone hydrazone,

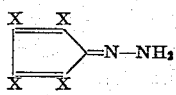

is oxidized, as by a suitable oxidizing agent, such as lead tetraacetate, or iodine with a suitable base, which may be an alkylamine in which the alkyl group is of 1 to 6 carbon atoms, such as trialkylamine, e.g., triethylamine to form the tetrahalodiazocyclopentadiene. Instead of the particular compounds named, various other suitable oxidizing agents may also be used, included among which may be indicated silver oxide, mercuric oxide, and bromine.

Oxidation of the tetrahalocyclopentadienone hydrazone may be effected at room temperature and temperatures of about 0 to 50 degrees centigrade are preferable. It is preferred to employ a proportion of oxidizing agent from about the stoichiometric amount to about a 200 precent excess. The reaction is usually effected in a non-aqueous solvent, e.g., diethyl ether. The desired tetrahalodiazocyclopentadiene may be conveniently separate from the reaction mixture, as by cooling, filtering to remove the triethylamine hydrogen iodide, lead diacetate or other oxidizing agent residue, removing water solubles, as by pouring into water, acidifying, treating with bisulfite (when iodine is used), separating, washing with water and drying the solvent layer, followed by evaporation of the solvent to yield the desired product.

The following non-limiting examples illustrate the invention. All parts are by weight and all temperatures are in degrees centigrade unless otherwise mentioned.

Example I—Preparation of tetrachlorodiazocyclopentadiene

Tetrachlorocyclopentadienone hydrazone (4.3 grams, 0.0185 moles), and triethylamine (10 cc.) were dissolved in 350 cc. ether. A solution of iodine (9.4 grams, 0.037 moles) in 100 cc. ether was added dropwise with stirring. After standing fifteen minutes at room temperature the mixture was cooled in an ice bath and filtered. The filterate was poured into 200 cc. water, acidified with HCl and treated with sodium bisulfite to remove excess oxidizing agent. The ether layer was separated, washed with water and dried over magnesium sulfate. Evaporation of the ether yielded 3.0 grams (70 percent) yellow crystals. Recrystallization from aqueous ethanol gave 2.1 grams yellow needles, melting at 110 degrees centigrade. The infrared spectrum (Nujol mull) indicated the absence of NH bands and exhibited bands at 4.6, 4.74, 6.55, 6.8, 7.2, 7.86, 9.28, 12.92 and 13.6 $\mu$. The ultraviolet spectrum had $\lambda_{max}$ of 304 and 312 m$\mu$ (both $\epsilon$ (extinction coefficient)=21,500).

Analysis.—Calculated for $C_5Cl_4N_2$: Cl=61.69%, N=12.19%. Found: Cl=61.9%, N=11.74%.

Instead of the tetrachlorocyclopentadienone hydrazone, when other halogen substituents are present on the hydrazone, e.g., tetrabromo-, tetraiodo- and mixed halogens, e.g. dichlorodibromocyclopentadienone hydrazones, the corresponding tetrahalodiazo, cyclopentadienes are made. Instead of triethylamine, other organic bases such as trimethylamine, tripropyl amine, methyl diethylamine may be substituted. Instead of the iodine-trialkylamine oxidizer, other suitable oxidizing agents, e.g., lead tetraacetate result in production of the desired tetrachlorodiazocyclopentadienes.

Tetrachlorodiazocyclopentadiene was tested and found to be effective against early blight, a fungus disease, at 400 parts per million concentration. It kills Staphylococcus aureus at 255 parts per million. In addition it is toxic to insects such as houseflies and is herbicidal, by standard tests.

Example II

Tetrachlorodiazocyclopentadiene (2.0 grams, 0.0087 moles) and cyclohexene (40 cc.) were heated at reflux for 17 hours. Removal of excess cyclohexene left 2.94 grams of a dark brown residue, chromatography on 60 grams of alumina led to the recovery of 1.42 grams tetrachlorodiazocyclopentadiene and the isolation of 0.56 grams

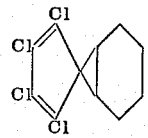

After recrystallization from aqueous ethanol

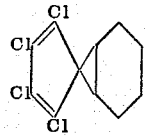

had a melting point of 104.5-106.5 degrees centigrade, $\lambda_{max}$ of 234 m$\mu$ ($\epsilon$=6,700), 264 m$\mu$ ($\epsilon$=4,200), 288 m$\mu$ ($\epsilon$=3,700) and $\gamma$ 6.35 $\mu$.

Analysis.—Calculated for $C_{11}H_{10}Cl_4$: C=46.52%, H=3.55%, Cl=49.94%. Found: C=46.39%, H=3.78%, Cl=49.35%.

Example III

Tetrachlorodiazocyclopentadiene (11.5 grams, 0.05 moles), bicycloheptadiene (10 grams, 0.11 moles) and dimethoxyethane (100 cc.) were refluxed together 18 hours. After removal of the solvent the residue (15 grams) was chromatographed on 300 grams alumina to yield 8.6 g. (58.5 percent)

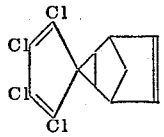

After sublimation

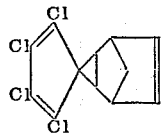

had a melting point of 58–59 degrees centigrade.

*Analysis.*—Calculated for $C_{12}H_8Cl_4$: C=49.00%, H=2.76%, Cl=48.24%. Found: C=49.02%, H=2.95%, Cl=48.19%.

This material was found to result in 100 percent kill of houseflies in a standard test at 1 percent concentration, after 24 hours.

Example IV

Tetrachlorodiazocyclopentadiene (0.46 grams, 0.002 moles), triphenyl phosphine (0.52 grams, 0.002 moles) and toluene (50 cc.) were heated 1 hour at 88 degrees centigrade. Removal of the solvent yielded

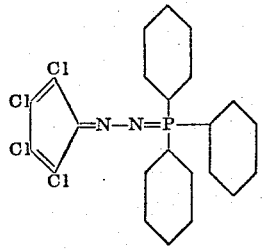

0.93 g. (95 percent).

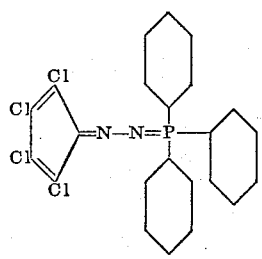

separated from ethanol as deep red needles of melting point of 142–143 degrees centigrade (decomposes), $\lambda_{max}$ 382 m$\mu$ ($\epsilon$=31,300) $\gamma$ 6.65, 6.7, 6.93 $\mu$.

*Analysis.*—Calculated for $C_{23}H_{15}Cl_4N_2P$: C=56.13%, H=3.07%, Cl=28.81%, P=6.29%. Found: C=55.99%, H=3.03%, Cl=28.70%, P=5.8%.

The invention has been described with respect to preferred embodiments thereof. It is not so limited and encompasses various equivalents and modifications, which will be apparent from the description given.

What is claimed is:
1. Tetrahalodiazocyclopentadiene.
2. Tetrachlorodiazocyclopentadiene.
3. A process for making a tetrahalodiazocyclopentadiene which comprises oxidizing a corresponding tetrahalocyclopentadienone hydrazone to the tetrahalodiazocyclopentadiene.
4. A process for making tetrachlorodiazoclopentadiene which comprises oxidizing tetrachlorodiazocyclopentadienone hydrazone with iodine and an organic base at a temperature from about 0 to about 50 degrees centigrade and separating the tetrachlorodiazocyclopentadiene made from the reaction mixture.
5. A process for making tetrachlorodiazocyclopentadiene which comprises oxidizing tetrachlorodiazocyclopentadienone hydrazone with lead tetraacetate at a temperature from about 0 to about 50 degrees centigrade and separating the tetrachlorodiazocyclopentadiene made from the reaction mixture.

No references cited.

NICHOLAS S. RIZZO, *Primary Examiner.*